(12) United States Patent
Iwanaka et al.

(10) Patent No.: US 10,518,774 B2
(45) Date of Patent: Dec. 31, 2019

(54) CONTROL DEVICE

(71) Applicant: AISIN AW CO., LTD., Anjo-shi, Aichi-ken (JP)

(72) Inventors: Makoto Iwanaka, Okazaki (JP); Yukiyasu Sukenari, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/080,361

(22) PCT Filed: Mar. 3, 2017

(86) PCT No.: PCT/JP2017/008518
§ 371 (c)(1),
(2) Date: Aug. 28, 2018

(87) PCT Pub. No.: WO2017/169509
PCT Pub. Date: Oct. 5, 2017

(65) Prior Publication Data
US 2019/0047570 A1 Feb. 14, 2019

(30) Foreign Application Priority Data

Mar. 30, 2016 (JP) ................................ 2016-067574

(51) Int. Cl.
*B60W 10/06* (2006.01)
*B60W 30/18* (2012.01)
(Continued)

(52) U.S. Cl.
CPC ...... *B60W 30/18118* (2013.01); *B60W 10/06* (2013.01); *B60W 10/196* (2013.01);
(Continued)

(58) Field of Classification Search
CPC ... B60W 2710/0666; B60W 2710/188; B60W 30/18118; B60W 10/196; B60W 10/06;
(Continued)

(56) References Cited

U.S. PATENT DOCUMENTS 5,807,205 A * 9/1998 Odaka ...................... B60L 7/00
477/20
7,926,889 B2 * 4/2011 Bell, Jr. .............. B60L 15/2009
303/191

(Continued)

FOREIGN PATENT DOCUMENTS

JP 2002-295657 A 10/2002
JP 2008-265533 A 11/2008

OTHER PUBLICATIONS

May 23, 2017 International Search Report issued in International Patent Application No. PCT/JP2017/008518.

*Primary Examiner* — Roger L Pang
(74) *Attorney, Agent, or Firm* — Oliff PLC

(57) ABSTRACT

A control device that controls a vehicle drive device provided with a transmission mechanism and a rotating member in a power transmission path in this order from a drive power source side, and provided with a parking lock mechanism that restricts rotation of the rotating member by allowing an engaging member to engage with the rotating member, the power transmission path connecting a drive power source to wheels.

2 Claims, 5 Drawing Sheets

(51) Int. Cl.
*B60W 10/196* (2012.01)
*F16H 63/34* (2006.01)

(52) U.S. Cl.
CPC .................. *B60W 2510/101* (2013.01); *B60W 2510/1005* (2013.01); *B60W 2510/188* (2013.01); *B60W 2520/04* (2013.01); *B60W 2550/142* (2013.01); *B60W 2710/0666* (2013.01); *B60W 2710/188* (2013.01); *F16H 63/3416* (2013.01); *Y10T 477/84* (2015.01); *Y10T 477/847* (2015.01); *Y10T 477/853* (2015.01)

(58) Field of Classification Search
CPC ....... B60W 2550/142; B60W 2520/04; B60W 2510/188; B60W 2510/101; B60W 2510/1005; F16H 63/3416; F02D 2550/26; Y10T 477/84; Y10T 477/847; Y10T 477/853
See application file for complete search history.

(56) References Cited

U.S. PATENT DOCUMENTS

| | | | |
|---|---|---|---|
| 8,764,608 B2 * | 7/2014 | Lim ..................... | B60W 10/06 477/194 |
| 2008/0033617 A1 * | 2/2008 | Watanabe ............... | B60K 6/44 701/48 |
| 2010/0263951 A1 | 10/2010 | Hayashi et al. | |
| 2015/0314770 A1 * | 11/2015 | Kitabatake ............ | B60K 6/383 477/9 |
| 2015/0337953 A1 * | 11/2015 | Kasuya .................... | B60K 6/48 192/219.5 |
| 2017/0080943 A1 * | 3/2017 | Feiner .................. | B60W 10/08 |
| 2017/0291601 A1 * | 10/2017 | Kim ..................... | B60W 10/04 |

* cited by examiner

CONTROL DEVICE

BACKGROUND

The present disclosure relates to a control device whose control target is a vehicle drive device that is provided with a transmission mechanism and a rotating member in a power transmission path in this order from a drive power source side, the power transmission path connecting the drive power source to wheels, and that is provided with a parking lock mechanism that restricts rotation of the rotating member by allowing an engaging member to engage with the rotating member.

For a control device such as that described above, a control device described in JP 2002-295657 A is known. As described in JP 2002-295657 A, a parking lock mechanism [parking mechanism 1] is controlled by a control device [control unit 100] such that when a parking range that locks wheels is selected by a range selection device [shift lever 40] provided in a vehicle, the parking lock mechanism goes into a locked state in which an engaging member [parking pawl 3] engages with a rotating member [parking gear 2], and when a drive range that allows the vehicle to travel forward or backward is selected by the range selection device, the parking lock mechanism goes into an unlocked state in which the engagement of the engaging member with the rotating member is released.

The control device described in JP 2002-295657 A is configured such that when the drive range is selected by the range selection device with the parking lock mechanism being in the locked state and the vehicle stopped on a hill, before the parking lock mechanism is switched to the unlocked state, a forward drive range is formed if the hill is an uphill slope and a reverse drive range is formed if the hill is a downhill slope. Namely, the control device is configured such that a drive range is formed such that counter torque which is torque in a direction in which load imposed by the self-weight of the vehicle is cancelled out acts on the rotating member on which the load is acting, from the drive power source side, and in this state the parking lock mechanism is switched to the unlocked state. By this, comparing to a case in which the parking lock mechanism is switched to the unlocked state before forming a drive range, the magnitude of a load accumulated in the rotating member at a point in time when the parking lock mechanism is switched to the unlocked state can be reduced, enabling to reduce shock that can occur upon switching the parking lock mechanism to the unlocked state.

Meanwhile, when control such as that described above is performed, a situation can occur in which a vehicle driver steps on an accelerator pedal during a period before the parking lock mechanism is switched to the unlocked state. When such a situation occurs, depending on the amount of stepping on the accelerator pedal, the magnitude of the counter torque becomes excessive over the load imposed by the self-weight of the vehicle, which can cause a state in which a relatively large load in an opposite direction to the load imposed by the self-weight of the vehicle is accumulated in the rotating member. If the parking lock mechanism is switched to the unlocked state in such a state, then relatively large shock can occur. However, JP 2002-295657 A does not describe this matter.

SUMMARY

Hence, it is desirable to implement a control device capable of reducing shock that can occur upon switching the parking lock mechanism to the unlocked state, even when the vehicle driver steps on the accelerator pedal during a period before the parking lock mechanism is switched to the unlocked state.

In view of the above, a characteristic configuration of a control device that controls a vehicle drive device provided with a transmission mechanism and a rotating member in a power transmission path in this order from a drive power source side, and provided with a parking lock mechanism that restricts rotation of the rotating member by allowing an engaging member to engage with the rotating member, the power transmission path connecting a drive power source to wheels, is that the control device includes an electronic control unit that is configured to perform lock release control when a drive range is selected by a range selection device with the transmission mechanism being in a neutral state in which torque transmission is not performed, the parking lock mechanism being in a locked state in which the engaging member engages with the rotating member, and a vehicle stopped on a hill, the range selection device being provided in the vehicle, and the drive range allowing the vehicle to travel forward or backward, the electronic control unit performs the lock release control to control the transmission mechanism such that counter torque is transmitted to the rotating member from the drive power source side, and release the engagement of the engaging member with the rotating member with the counter torque transmitted to the rotating member, the counter torque being torque in an opposite direction to torque acting on the rotating member from the wheels side according to gradient of a road surface, and the electronic control unit is configured to perform torque limiting control at least during a period while the lock release control is performed, the torque limiting control limiting a magnitude of output torque from the drive power source to less than or equal to a predetermined threshold regardless of an amount of operation on an accelerator pedal provided in the vehicle, and the period being from when the transmission of the counter torque to the rotating member starts until the engagement of the engaging member with the rotating member is released.

According to the above characteristic configuration, by performing torque limiting control, the magnitude of output torque from the drive power source can be limited to less than or equal to the predetermined threshold, regardless of the amount of operation on the accelerator pedal provided in the vehicle. The torque limiting control is performed at least during a period from when transmission of counter torque to the rotating member starts until engagement of the engaging member with the rotating member is released, while lock release control is performed. Namely, the torque limiting control is performed at least during a period during which the counter torque can act on the rotating member engaging with the engaging member from the drive power source side. Thus, even when a vehicle driver steps on the accelerator pedal during a period from when lock release control starts until the parking lock mechanism is switched to the unlocked state, the magnitude of the counter torque can be suppressed from becoming excessive over torque acting on the rotating member from the wheel side according to the gradient of a road surface. As a result, even when the vehicle driver steps on the accelerator pedal during a period before the parking lock mechanism is switched to the unlocked state, it becomes possible to reduce shock that can occur upon switching the parking lock mechanism to the unlocked state.

Further features and advantages of the control device will become clearer from the following description of an embodiment described with reference to drawings.

DETAILED DESCRIPTION OF EMBODIMENTS

Figure 1:
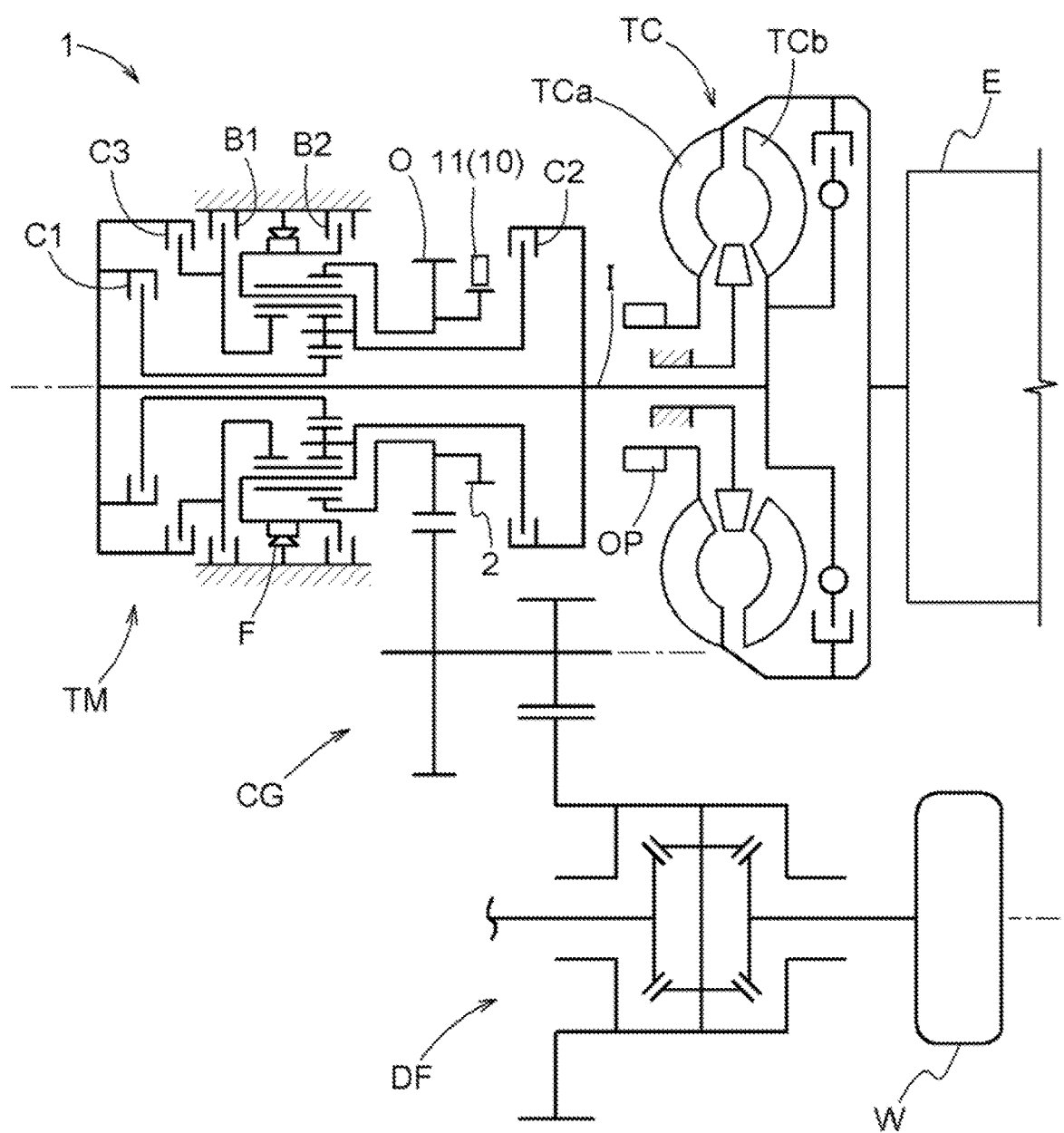
FIG. 1 is a skeleton diagram of a vehicle drive device according to an embodiment.

An embodiment of a control device will be described with reference to the drawings. In the following description, "drive-coupling" refers to a state in which two rotating elements are coupled to each other so that drive power can be transmitted. This concept includes a state in which two rotating elements are coupled to each other so as to rotate together, and a state in which two rotating elements are coupled to each other via one or more transmission members so that drive power can be transmitted. Such transmission members include various types of members (shafts, gear mechanisms, belts, chains, etc.) that transmit rotation at the same speed or at variable speeds, and may include engagement devices (friction engagement devices, mesh engagement devices, etc.) that selectively transmit rotation and drive power.

In addition, for the state of engagement of a friction engagement device, an "engaged state" is a state in which transmission torque capacity is generated in the friction engagement device. The transmission torque capacity is the magnitude of maximum torque that the friction engagement device can transmit by friction. The magnitude of the transmission torque capacity changes in proportion to the engagement pressure of the friction engagement device (pressure that presses an input side's engaging member and an output side's engaging member against each other). The engaged state includes a "direct-coupling engaged state" in which there is no rotational speed difference (slippage) between a pair of engaging members of the friction engagement device (between the input side's engaging member and the output side's engaging member), and a "slip-engaged state" in which there is a rotational speed difference between the pair of engaging members of the friction engagement device.

In addition, a "disengaged state" is a state in which transmission torque capacity is not generated in the friction engagement device. Even when an instruction to generate transmission torque capacity is not issued by the control device, transmission torque capacity may be generated in the friction engagement device due to drag between engaging members (friction members). In this specification, such drag torque is not considered upon classifying the state of engagement, and the disengaged state also includes a state in which transmission torque capacity is generated by drag between the engaging members when an instruction to generate transmission torque capacity is not issued.

In the engaged state of the friction engagement device, torque is transmitted between a pair of engaging members by friction between the pair of engaging members. In the slip-engaged state of the friction engagement device, torque (slip torque) having the magnitude of transmission torque capacity is transmitted by dynamic friction to an engaging member with a lower rotational speed from an engaging member with a higher rotational speed. On the other hand, in the direct-coupling engaged state of the friction engagement device, torque acting between the pair of engaging members is transmitted by static friction, with the magnitude of transmission torque capacity being an upper limit.

1. Overall Configuration of a Vehicle Drive Device

As shown in FIG. 1, a vehicle drive device 1 which is a control target of a control device 30 includes a transmission mechanism TM and a parking gear 2 in a power transmission path in this order from a drive power source E side, the power transmission path connecting the drive power source E to wheels W. The transmission mechanism TM changes the rotational speed of an input member I (transmission input member) and transmits the rotation to an output member O (transmission output member). The input member I is drive-coupled to the drive power source E, and the output member O is drive-coupled to the wheels W. In the present embodiment, the output member O is drive-coupled to the wheels W via an output differential gear device DF. In addition, in the present embodiment, the output member O is drive-coupled to the output differential gear device DF via a counter gear mechanism CG. Rotation and torque that are transmitted to the output member O from the drive power source E side are transmitted via the output differential gear device DF to the two left and right wheels W in a distribution manner. By this, the vehicle drive device 1 transmits the torque of the drive power source E to the wheels W and thereby allows a vehicle to travel. In addition, the vehicle drive device 1 includes a parking lock mechanism 10. Though details will be described later, the parking lock mechanism 10 is a mechanism for restricting the rotation of the parking gear 2 by allowing a parking pawl 11 to engage with the parking gear 2. In the present embodiment, the parking gear 2 corresponds to a "rotating member" and the parking pawl 11 corresponds to an "engaging member".

For the drive power source E, for example, at least one of an internal combustion engine and a rotating electrical machine is used. Here, the internal combustion engine is a prime mover that is driven by fuel combustion inside the engine to take out power (e.g., a gasoline engine, diesel engine, etc.). In addition, the rotating electrical machine is used as a concept that includes all of a motor, a generator, and, as necessary, a motor-generator that functions as both a motor and a generator. In the present embodiment, the drive power source E is an internal combustion engine. In addition, in the present embodiment, as shown in FIG. 1, the drive power source E is drive-coupled to the input member I via a torque converter TC. Specifically, an output member (e.g., a crankshaft, etc.) of the drive power source E is coupled to a pump impeller TCa of the torque converter TC such that they rotate together, and a turbine runner TCb of the torque converter TC is coupled to the input member I such that they rotate together. In addition, in the present embodiment, as an oil pump OP that generates hydraulic pressure required for the vehicle, an oil pump (mechanical pump) driven by the drive power source E is provided. Specifically, a drive shaft of the oil pump OP is coupled to the pump impeller TCa such that they rotate together. The configuration can also be such that, for the oil pump OP, an oil pump (motor-driven pump) driven by a rotating electrical machine for a pump is provided instead of the oil pump driven by the drive power source E, or is separately provided in addition to the oil pump driven by the drive power source E.

In the present embodiment, the transmission mechanism TM is a stepped automatic transmission mechanism configured to be able to shift a plurality of gears with different gear ratios. As shown in FIG. 1, the transmission mechanism TM includes a gear mechanism and a plurality of transmission engagement devices that perform engagement or disengagement of a rotating element of the gear mechanism. The transmission mechanism TM selectively forms a plurality of gears according to the state of engagement of each of the plurality of transmission engagement devices, changes the rotational speed of the input member I at a gear ratio determined according to the gear, and transmits the rotation to the output member O.

In the present embodiment, the transmission mechanism TM includes, as the transmission engagement devices, a first clutch C1, a second clutch C2, a third clutch C3, a first brake B1, a second brake B2, and a one-way clutch F. In the present embodiment, the transmission mechanism TM is configured to be able to form four gears with different gear ratios (the ratio of the rotational speed of the input member I to the rotational speed of the output member O) as forward gears. When one of the forward gears with the highest gear ratio is a first gear, in a case of transmitting forward-direction torque (torque in a direction in which the vehicle travels forward) which is output from the drive power source E to the wheels W, the first clutch C1 is controlled to an engaged state and other transmission engagement devices (note, however, that the one-way clutch F is excluded) are controlled to a disengaged state, by which the first gear is formed. Note that in a case of performing braking (so-called engine braking) using the rotation resistance of the internal combustion engine serving as the drive power source E, the second brake B2 is controlled to an engaged state in addition to the first clutch C1, by which the first gear is formed. In addition, by controlling both of the third clutch C3 and the second brake B2 to an engaged state and controlling other transmission engagement devices to a disengaged state, a reverse gear is formed.

When a state in which the transmission mechanism TM does not perform torque transmission is a "neutral state", in the present embodiment, in a state in which the transmission mechanism TM does not form a gear, the transmission mechanism TM goes into the neutral state. Namely, the transmission mechanism TM goes into the neutral state in a state in which all transmission engagement devices are disengaged or in a state in which one of a plurality of transmission engagement devices (in the present embodiment, two transmission engagement devices) that are engaged to form a gear is disengaged.

As described above, the vehicle drive device 1 includes the transmission mechanism TM and the parking gear 2 in the power transmission path in this order from the drive power source E side, the power transmission path connecting the drive power source E to the wheels W. Note that the transmission mechanism TM includes a rotating member that always rotates in conjunction with the output member O (in the example shown in FIG. 1, a ring gear forming a planetary gear mechanism; hereinafter, referred to as "conjunction rotating member"), and the positions of the output member O and the conjunction rotating member in the above-described power transmission path are on the opposite side of the transmission mechanism TM from the drive power source E side (i.e., on the wheels W side relative to the transmission mechanism TM). In other words, the "transmission mechanism TM" when mentioning a disposition relationship between the transmission mechanism TM and the parking gear 2 in the power transmission path does not include the output member O and the conjunction rotating member. Thus, the parking gear 2 is provided at the same location as the output member O or the conjunction rotating member in the power transmission path, or provided more on the wheels W side than the output member O or the conjunction rotating member in the power transmission path. Note that the expression "always rotate in conjunction with" refers to that a relationship between the rotational speeds of two target rotating members is always proportional to a constant proportional coefficient, regardless of the state of the vehicle drive device 1 (a gear formation state of the transmission mechanism TM, etc.).

As described above, the parking gear 2 is provided more on the wheels W side than the transmission mechanism TM in the power transmission path connecting the drive power source E to the wheels W. The parking gear 2 is provided so as to always rotate in conjunction with the wheels W. Namely, the parking gear 2 is provided so as to always maintain direct-coupling to the wheels W or coupling to the wheels W via other members. By this, with the rotation of the parking gear 2 restricted by the parking lock mechanism 10 (in the present embodiment, the parking pawl 11), the wheels W are locked. In the present embodiment, each rotating member that forms the power transmission path between the transmission mechanism TM and the wheels W is configured so as to always rotate in conjunction with the wheels W. In the present embodiment, the parking gear 2 is provided so as to rotate together with the output member O. Note that the configuration can also be such that the parking gear 2 is provided so as to rotate together with other rotating members such as a countershaft of the counter gear mechanism CG.

Figure 2:
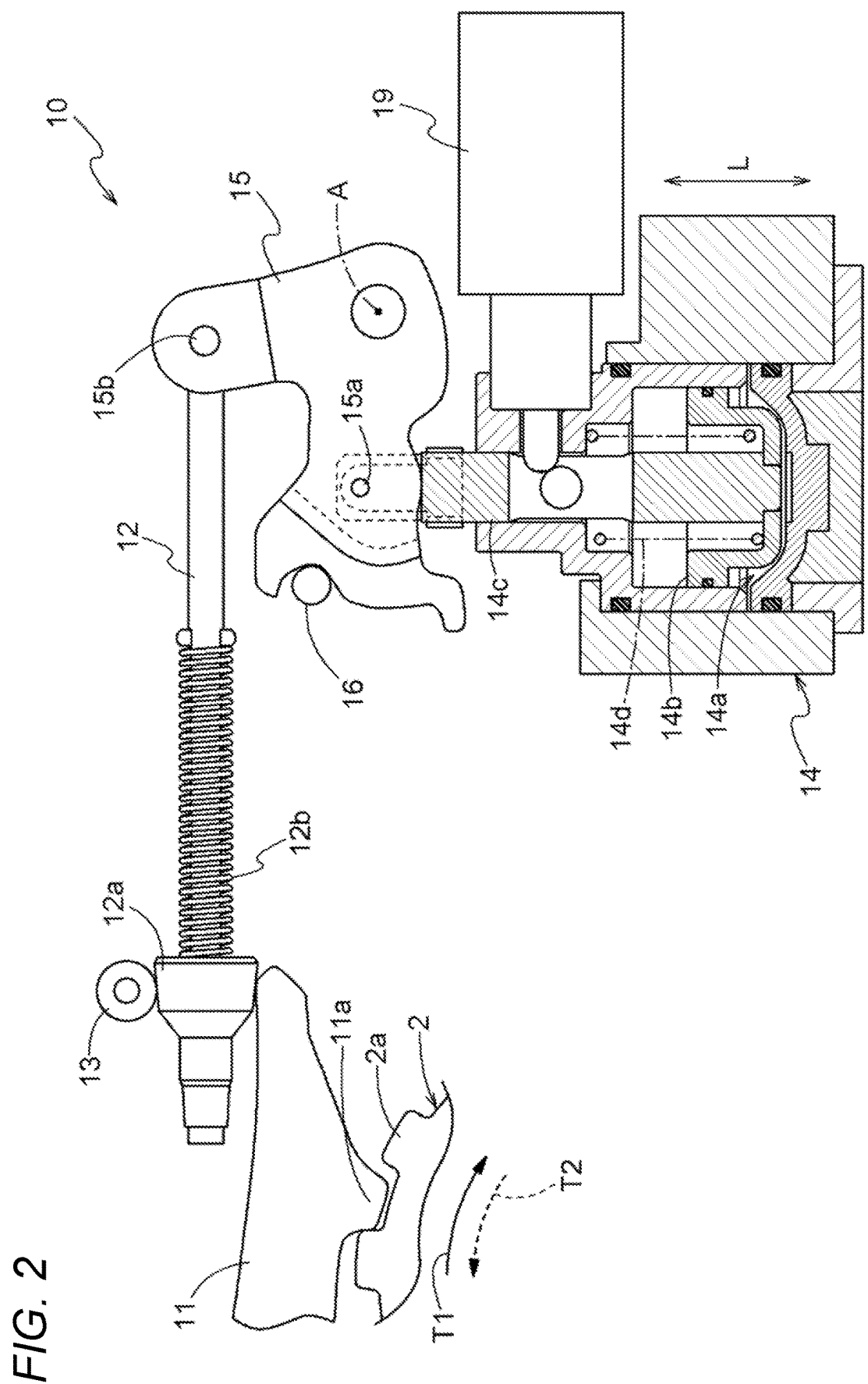
FIG. 2 is a schematic configuration diagram of a parking lock mechanism according to the embodiment.

In the present embodiment, as shown in FIG. 2, the parking lock mechanism 10 includes the parking pawl 11, as an engaging member to engage with the parking gear 2. The parking pawl 11 is configured to be displaceable between an engaged position in which the parking pawl 11 engages with the parking gear 2 (the position shown in FIG. 2) and an unengaged position in which the engagement of the parking pawl 11 with the parking gear 2 is released. In a state in which the parking pawl 11 is located in the engaged position, an engaging part 11a of the parking pawl 11 engages with a tooth 2a of the parking gear 2, going into a locked state in which the parking pawl 11 engages with the parking gear 2. In addition, in a state in which the parking pawl 11 is located in the unengaged position, the engagement of the engaging part 11a of the parking pawl 11 with the tooth 2a of the parking gear 2 is released, going into an unlocked state in which the engagement of the parking pawl 11 with the parking gear 2 is released.

In the present embodiment, the parking lock mechanism 10 includes a parking rod 12 for allowing the parking pawl 11 to be displaced (in the present embodiment, to swing) between the engaged position and the unengaged position. The parking rod 12 is provided with a cam member 12a at its front-end portion (an end portion on the parking pawl 11 side). The cam member 12a is swingably supported on the parking rod 12 and is biased toward the front-end portion side by a biasing member 12b. In addition, the parking pawl 11 is biased toward the unengaged position side by a biasing member (not shown). By the parking rod 12 moving to the parking pawl 11 side up to the position shown in FIG. 2 (here, a position in which a portion of the cam member 12a with the largest diameter is sandwiched between the parking pawl 11 and a support member 13), the parking pawl 11 is pressed so as to engage with the parking gear 2 by the cam member 12a being biased by the biasing member 12b, by which the parking pawl 11 is maintained in the engaged position. In addition, by the parking rod 12 moving to a side away from the parking pawl 11 from the position shown in FIG. 2, the parking pawl 11 moves to the unengaged position side from the engaged position by a bias force of the biasing member (not shown), by which the parking pawl 11 is maintained in the unengaged position. As such, the parking pawl 11 is displaced between the engaged position and the unengaged position in conjunction with the back-and-force movement (movement in a near-far direction relative to the parking pawl 11) of the parking rod 12.

In the present embodiment, the parking lock mechanism 10 is configured such that the parking rod 12 moves back and forth by a hydraulic actuator 14. Namely, in the present embodiment, the state of the parking lock mechanism 10 is switched between the locked state and the unlocked state by the hydraulic actuator 14. Specifically, the hydraulic actuator 14 includes an oil chamber 14a to which hydraulic pressure is supplied from a hydraulic control device 32 (see FIG. 3); a piston 14b that moves in an axial direction L (an up-down direction in FIG. 2) according to the hydraulic pressure supplied to the oil chamber 14a; a piston rod 14c that is fixed to the piston 14b and extends in the axial direction L; and a spring 14d that biases the piston 14b toward the oil chamber 14a side. A front-end portion of the piston rod 14c (an end portion on the opposite side of a coupling portion to the piston 14b) is rotatably coupled to a detent lever 15 at a first coupling part 15a. The detent lever 15 is configured to swing around a swing shaft A. In addition, a base-end portion of the parking rod 12 (an end portion on the opposite side of the side where the cam member 12a is provided) is rotatably coupled to the detent lever 15 at a second coupling part 15b which is provided at a location different in a circumferential direction (circumferential direction around the swing shaft A) from the first coupling part 15a. By this, the detent lever 15 swings around the swing shaft A by the movement of the piston rod 14c in the axial direction L, and accordingly, the parking rod 12 moves in the near-far direction relative to the parking pawl 11. Note that the detent lever 15 is configured such that a concave part with which an engaging member 16 engages is formed in the detent lever 15 so that the swing of the detent lever 15 around the swing shaft A is restricted to a certain extent by the engaging member 16.

In the present embodiment, as shown in FIG. 2, the parking lock mechanism 10 is configured to go into the locked state when hydraulic pressure is not being supplied to the oil chamber 14a. Then, when hydraulic pressure (e.g., line pressure) from the hydraulic control device 32 is supplied to the oil chamber 14a, the piston rod 14c moves to a side away from the oil chamber 14a in the axial direction L (the upper side in FIG. 2) against the bias force of the spring 14d, by which the detent lever 15 rotates and moves in a clockwise direction in FIG. 2, and accordingly, the parking rod 12 moves to a side away from the parking pawl 11 (the right side in FIG. 2). By this, the parking lock mechanism 10 is switched to the unlocked state. In addition, when the supply of hydraulic pressure to the oil chamber 14a is stopped with the parking lock mechanism 10 switched to the unlocked state, the piston rod 14c moves to the oil chamber 14a side in the axial direction L (the lower side in FIG. 2) by the bias force of the spring 14d, by which the detent lever 15 rotates and moves in a counterclockwise direction in FIG. 2, and accordingly, the parking rod 12 moves to a side approaching the parking pawl 11 (the left side in FIG. 2). By this, the parking lock mechanism 10 is switched to the locked state.

In the present embodiment, the parking lock mechanism 10 includes a lock device 19. Though details of the lock device 19 are omitted, the lock device 19 is configured to be switchable between a restricted state in which the movement of the piston rod 14c in the axial direction L is restricted, and an allowed state in which the movement of the piston rod 14c in the axial direction L is allowed. Upon switching between the locked state and unlocked state of the parking lock mechanism 10, the lock device 19 is switched to the allowed state. On the other hand, when the state of the parking lock mechanism 10 is maintained in the locked state or unlocked state, the lock device 19 is switched to the restricted state. By switching the lock device 19 to the restricted state, for example, even when hydraulic pressure supplied to the oil chamber 14a decreases with the parking lock mechanism 10 switched to the unlocked state, the piston rod 14c is restricted from moving to the oil chamber 14a side in the axial direction L, enabling the parking lock mechanism 10 to maintain the unlocked state. An example of a situation in which hydraulic pressure supplied to the oil chamber 14a decreases with the parking lock mechanism 10 switched to the unlocked state includes a situation in which idle reduction control is performed that stops fuel supply to the internal combustion engine serving as the drive power source E with a vehicle main power supply being in an on state.

2. Configuration of the Control Device

The control device 30 is configured to include, as a core member, an arithmetic processing unit such as a CPU (or an ECU), and include storage devices such as a RAM and a ROM, and the like. Each function performed by the control device 30 is implemented by software (program) stored in the ROM, etc., or hardware provided separately such as an arithmetic circuit, or both of software and hardware. The arithmetic processing unit included in the control device 30 operates as a computer that executes each program. Note that the control device 30 may be configured by a set of a plurality of pieces of hardware (a plurality of separated pieces of hardware) that can communicate with each other.

Figure 3:
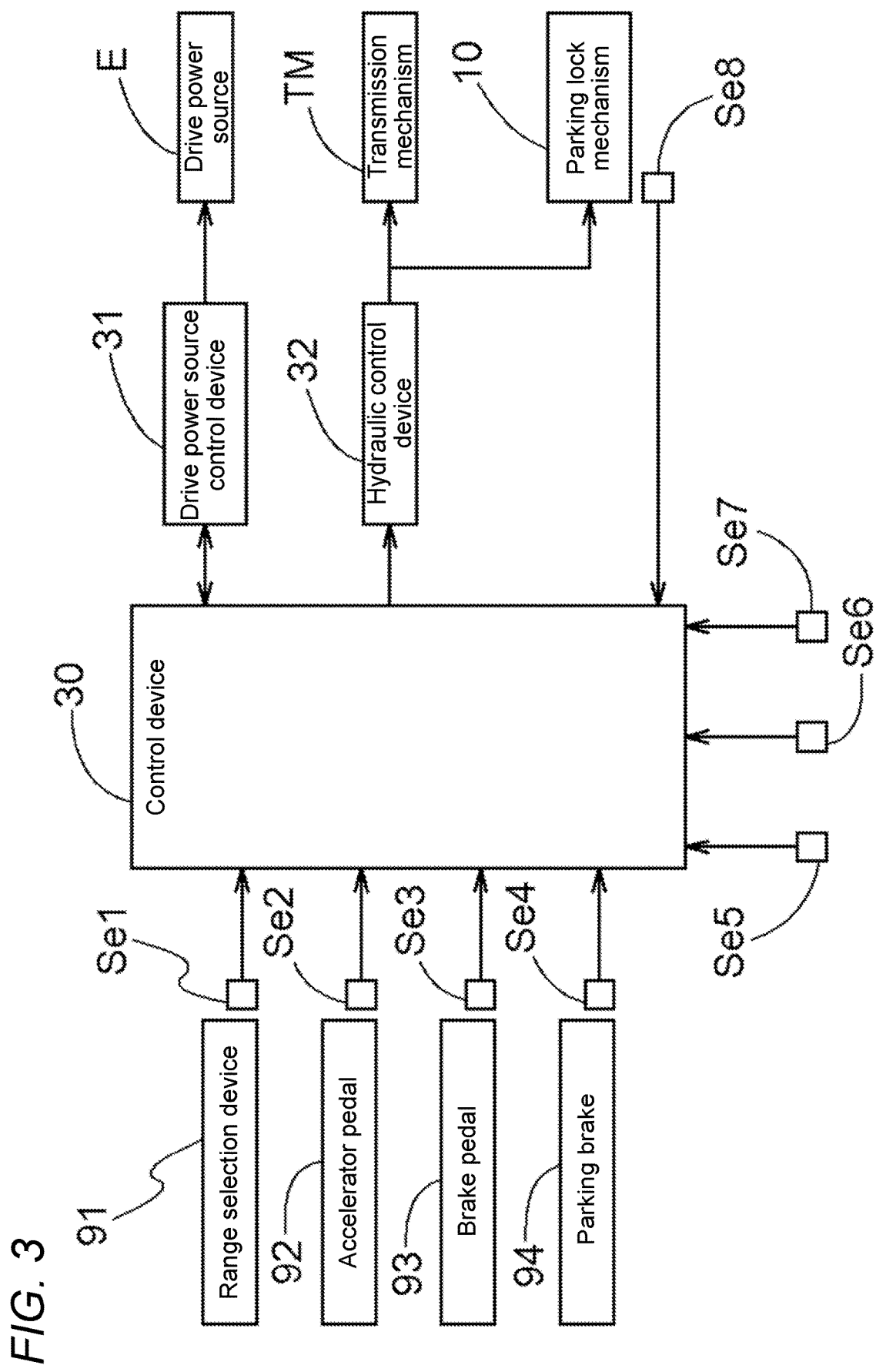
FIG. 3 is a block diagram showing a control configuration according to the embodiment.

The control device 30 is configured to be able to obtain information on detection results obtained by various types of sensors included in each part of the vehicle. In the present embodiment, as shown in FIG. 3, the control device 30 is configured to be able to obtain information on detection results obtained by a range sensor Se1, an accelerator pedal position sensor Se2, a brake sensor Se3, a parking brake sensor Se4, a gradient sensor Se5, an oil temperature sensor Se6, rotational speed sensors Se7, and a parking lock sensor Se8, respectively. Note that the control device 30 can also be configured to obtain detection information of at least any one of the sensors, from another control device (e.g., a drive power source control device 31 which will be described later, etc.).

The range sensor Se1 detects a range (shift range) selected by a range selection device 91 (shift operation device) provided in the vehicle. The range selection device 91 is operated by a vehicle driver. The range selection device 91 can be configured, for example, to be provided with a shift lever or switches for selecting one range from among a plurality of ranges. The ranges selectable by the range selection device 91 include a forward drive range (D-range) which is a drive range allowing the vehicle to travel forward;

a reverse drive range (R-range) which is a drive range allowing the vehicle to travel backward; a neutral range (N-range) for placing the transmission mechanism TM in the neutral state; and a parking range (P-range) that places the transmission mechanism TM in the neutral state and locks the wheels W. When the P-range is selected by the range selection device 91, the control device 30 controls the parking lock mechanism 10 to the locked state, and when ranges other than the P-range are selected by the range selection device 91, the control device 30 controls the parking lock mechanism 10 to the unlocked state. Namely, the parking lock mechanism 10 is not mechanically coupled to the range selection device 91, and the state of the parking lock mechanism 10 is controlled by the control device 30 based on detection information obtained by the range sensor Se1.

The accelerator pedal position sensor Se2 detects the amount of operation on an accelerator pedal 92 provided in the vehicle. Namely, the accelerator pedal position sensor Se2 detects an accelerator pedal position determined according to the amount of stepping on the accelerator pedal 92 by the driver. The brake sensor Se3 detects the amount of operation on a brake pedal 93 provided in the vehicle. Namely, the brake sensor Se3 detects the amount of brake operation determined according to the amount of stepping on the brake pedal 93 by the driver. The parking brake sensor Se4 detects an operating state of a parking brake 94 provided in the vehicle. The parking brake 94 is a different parking brake than a service brake operated by the brake pedal 93.

The gradient sensor Se5 detects a gradient of a road (road surface) on which the vehicle travels. The gradient sensor Se5 detects a gradient of a road surface by detecting the angle of inclination with respect to a horizontal plane in a front-rear direction of the vehicle. The gradient sensor Se5 is constituted of, for example, an inclination sensor including a pendulum member. The oil temperature sensor Se6 detects an oil temperature in the vehicle drive device 1. The rotational speed sensors Se7 detect the rotational speeds of rotating members included in the vehicle drive device 1, or rotating members (an output member of the drive power source E, the wheels W, etc.) that are drive-coupled to the vehicle drive device 1. In the present embodiment, the plurality of rotational speed sensors Se7 are provided in the vehicle. Specifically, a sensor that detects the rotational speed of the drive power source E or a rotating member that synchronously rotates with the drive power source E, a sensor that detects the rotational speed of the input member I or a rotating member that synchronously rotates with the input member I, and a sensor that detects the rotational speed of the output member O or a rotating member that synchronously rotates with the output member O are provided as the rotational speed sensors Se7 in the vehicle. Note that the synchronous rotation refers to rotation together or rotation at a proportional rotational speed.

The parking lock sensor Se8 detects a physical quantity about the state of the parking lock mechanism 10. The control device 30 determines whether the parking lock mechanism 10 is in the locked state, based on information on a detection result obtained by the parking lock sensor Se8. For example, one or both of a sensor that detects the rotational position of the detent lever 15 and a sensor that detects the position of the piston rod 14c is(are) provided as the parking lock sensor(s) Se8 in the vehicle.

As shown in FIG. 3, the control targets of the control device 30 are the transmission mechanism TM and the parking lock mechanism 10. In addition, the drive power source E is also a control target of the control device 30. The control device 30 determines wheel required torque which is required to drive the wheels W, and a target gear to be formed by the transmission mechanism TM, based on sensor detection information (information such as an accelerator pedal position, a vehicle speed, and a shift range). Then, the control device 30 determines target torque of the drive power source E based on the determined wheel required torque, and controls the drive power source E to output the target torque. In the present embodiment, the control device 30 is configured to control the drive power source E via the drive power source control device 31, and the drive power source control device 31 controls the drive power source E to output the target torque instructed by the control device 30. In addition, when there is a start request for the internal combustion engine serving as the drive power source E from the control device 30, the drive power source control device 31 allows the internal combustion engine to start by, for example, starting fuel supply to the internal combustion engine and ignition of the internal combustion engine, and when there is a stop request for the internal combustion engine serving as the drive power source E from the control device 30, the drive power source control device 31 allows the internal combustion engine to stop by, for example, stopping fuel supply to the internal combustion engine and ignition of the internal combustion engine.

In addition, the control device 30 controls the transmission mechanism TM to form the determined target gear. Specifically, the control device 30 controls the state of engagement of each of the plurality of transmission engagement devices to form the determined target gear. In the present embodiment, the plurality of transmission engagement devices included in the transmission mechanism TM (note, however, that the one-way clutch F is excluded) are hydraulically actuated engagement devices (in this example, hydraulically actuated friction engagement devices). The control device 30 controls the state of engagement of each transmission engagement device by controlling, via the hydraulic control device 32, hydraulic pressure supplied to each transmission engagement device. The state of engagement of each transmission engagement device is controlled to any of a directly-coupling engaged state, a slip-engaged state, and a disengaged state, according to the hydraulic pressure to be supplied.

In the present embodiment, as described above, the state of the parking lock mechanism 10 is switched by the hydraulic actuator 14 between the locked state and the unlocked state. Thus, in the present embodiment, the control device 30 controls the state of the parking lock mechanism 10 by controlling, via the hydraulic control device 32, hydraulic pressure supplied to the hydraulic actuator 14 (in the present embodiment, the oil chamber 14a). Though details are omitted, the hydraulic control device 32 includes a plurality of hydraulic control valves (a linear solenoid valve, etc.) for adjusting the hydraulic pressure of hydraulic oil supplied from the oil pump OP. In the present embodiment, the plurality of hydraulic control valves include a line pressure control valve (pressure regulator valve) that controls discharge pressure from the oil pump OP to line pressure, a linear solenoid valve for controlling hydraulic pressure supplied to the transmission engagement devices, and a switching valve that switches between a state in which hydraulic oil pressure (in the present embodiment, line pressure) is supplied to the hydraulic actuator 14 and a state in which hydraulic oil pressure is not supplied to the hydraulic actuator 14.

The control device 30 performs lock release control when a drive range that allows the vehicle to travel forward or backward is selected by the range selection device 91 provided in the vehicle, with the transmission mechanism TM being in the neutral state in which torque transmission is not performed, the parking lock mechanism 10 being in the locked state in which the parking pawl 11 engages with the parking gear 2, and the vehicle stopped on a hill. Namely, the control device 30 performs lock release control when the D-range or R-range (in other words, ranges other than the N-range) is selected by the range selection device 91, with the vehicle stopped on a hill in the P-range.

The lock release control controls the transmission mechanism TM such that counter torque T2 is transmitted to the parking gear 2 from the drive power source E side, and releases the engagement of the parking pawl 11 with the parking gear 2 with the counter torque T2 transmitted to the parking gear 2. Here, the counter torque T2 is, as shown in FIG. 2, torque in an opposite direction to torque that acts on the parking gear 2 from the wheels W side according to the gradient of a road surface (hereinafter, referred to as "road surface gradient torque T1"). Thus, when the vehicle is stopped on an uphill slope, the counter torque T2 is torque in a direction in which the vehicle travels forward, and when the vehicle is stopped on a downhill slope, the counter torque T2 is torque in a direction in which the vehicle travels backward. In the present embodiment, when the vehicle is stopped on an uphill slope, the transmission mechanism TM is controlled to form a forward gear (basically, the first gear), by which the counter torque T2 is transmitted to the parking gear 2. In addition, in the present embodiment, when the vehicle is stopped on a downhill slope, the transmission mechanism TM is controlled to form a reverse gear, by which the counter torque T2 is transmitted to the parking gear 2.

As described above, by releasing the engagement of the parking pawl 11 with the parking gear 2 with the counter torque T2 transmitted to the parking gear 2, it becomes possible to reduce the magnitude of a load accumulated in the parking gear 2 at the time of switching the parking lock mechanism 10 to the unlocked state (more specifically, a load accumulated in an engagement portion between the parking gear 2 and the parking pawl 11), compared to a case in which the engagement of the parking pawl 11 with the parking gear 2 is released with the counter torque T2 not transmitted to the parking gear 2. Namely, as shown in FIG. 2, in a state in which the road surface gradient torque T1 is acting on the parking gear 2, a tooth 2a of the parking gear 2 is being pressed against a surface of the engaging part 11a of the parking pawl 11 facing in an opposite direction to the road surface gradient torque T1, by a force of a magnitude according to the road surface gradient torque T1. By transmitting the counter torque T2 to the parking gear 2 as described above, the pressing force of the tooth 2a of the parking gear 2 on the engaging part 11a of the parking pawl 11 is reduced, enabling to reduce the magnitude of a load accumulated in the parking gear 2. As a result, it becomes possible to reduce shock that can occur upon switching the parking lock mechanism 10 to the unlocked state. Though details are omitted, when a drive range that allows the vehicle to travel forward or backward is selected by the range selection device 91 with the transmission mechanism TM being in the neutral state, the parking lock mechanism 10 being in the locked state, and the vehicle stopped on a flat road instead of a hill, unlike the lock release control performed here, the transmission mechanism TM is controlled to form the selected drive range after releasing the engagement of the parking pawl 11 with the parking gear 2.

Meanwhile, the counter torque T2 is output torque from the drive power source E that is transmitted to the parking gear 2 via the transmission mechanism TM. Thus, the magnitude of the counter torque T2 basically increases as the output torque from the drive power source E increases. As is clear from FIG. 2, if the magnitude of the counter torque T2 becomes larger than the magnitude of the road surface gradient torque T1, then it can cause a state in which a tooth 2a of the parking gear 2 is pressed against a surface of the engaging part 11a of the parking pawl 11 facing in the same direction as the road surface gradient torque T1. Then, if the magnitude of the counter torque T2 becomes excessive over the road surface gradient torque T1, then it causes a state in which a relatively large load in an opposite direction to a load imposed by the road surface gradient torque T1 is accumulated in the parking gear 2, which may cause relatively large shock upon switching the parking lock mechanism 10 to the unlocked state.

In view of the above-described facts, the control device 30 performs torque limiting control at least during a period from when the transmission of the counter torque T2 to the parking gear 2 starts until the engagement of the parking pawl 11 with the parking gear 2 is released, while lock release control is performed. The torque limiting control limits the magnitude of output torque from the drive power source E to less than or equal to a predetermined threshold X, regardless of the amount of operation on the accelerator pedal 92 provided in the vehicle. In the torque limiting control, for example, the magnitude of output torque from the drive power source E is controlled to the threshold X. By this, at least during a period during which the counter torque T2 can act on the parking gear 2 engaging with the parking pawl 11, the magnitude of output torque from the drive power source E can be limited to less than or equal to the threshold X by performing torque limiting control. Thus, even when the vehicle driver steps on the accelerator pedal 92 during a period from when lock release control starts until the parking lock mechanism 10 is switched to the unlocked state, the magnitude of the counter torque T2 can be suppressed from becoming excessive over the road surface gradient torque T1. As a result, even when the vehicle driver steps on the accelerator pedal 92 during a period before the parking lock mechanism 10 is switched to the unlocked state, it becomes possible to reduce shock that can occur upon switching the parking lock mechanism 10 to the unlocked state.

The value of the threshold X is set, for example, such that the magnitude of the counter torque T2 is less than or equal to the magnitude of the road surface gradient torque T1. The control device 30 determines the threshold X, for example, based on the magnitude of the road surface gradient torque T1, in other words, based on the magnitude of gradient of a road surface. For example, the threshold X is determined so as to increase as the magnitude of the road surface gradient torque T1 (the magnitude of gradient of a road surface) increases. In the present embodiment, the torque converter TC is provided in the power transmission path present between the drive power source E and the transmission mechanism TM. Thus, the magnitude of the counter torque T2 changes according also to the state (speed ratio, etc.) of the torque converter TC, in addition to the output torque from the drive power source E. Thus, the control device 30 may be configured to determine the threshold X based also on the state of the torque converter TC, in addition to the magnitude of the road surface gradient torque T1 (the magnitude of gradient of a road surface). In the present embodiment, when torque limiting control is performed, the control device 30 outputs a torque limiting instruction including information on the value of the threshold X to the drive power source control device 31. Then, the drive power source control device 31 controls the magnitude of the output torque from the drive power source E to less than or equal to the threshold X by performing control of the throttle position, control of ignition timing, etc.

Figure 4:
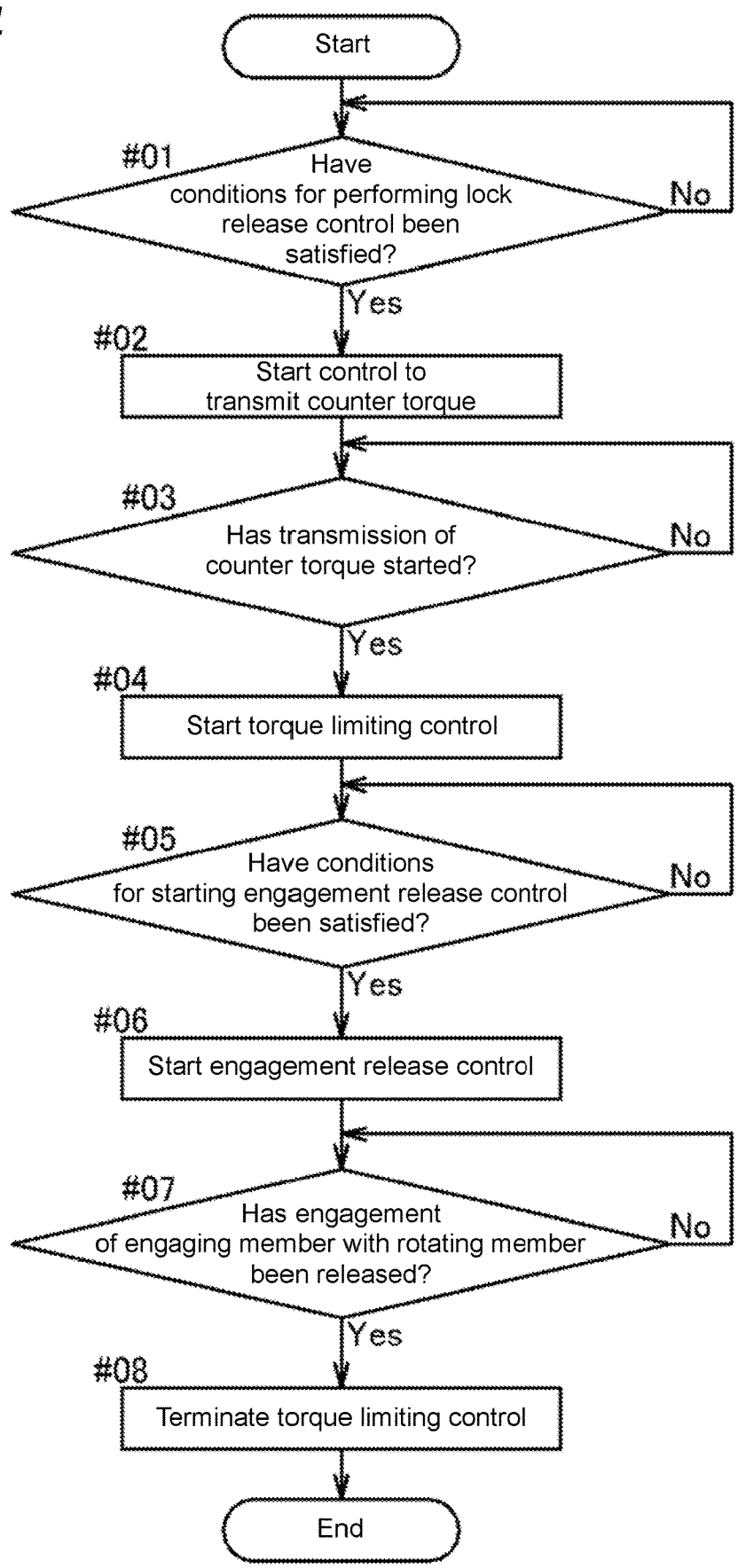
FIG. 4 is a flowchart showing a processing procedure of lock release control according to the embodiment.

In the present embodiment, the control device 30 performs lock release control in accordance with a procedure shown in FIG. 4. The control device 30 determines whether conditions for performing lock release control have been satisfied (step #01). The conditions for performing lock release control are satisfied when a drive range that allows the vehicle to travel forward or backward is selected by the range selection device 91 with the transmission mechanism TM being in the neutral state, the parking lock mechanism 10 being in the locked state, and the vehicle stopped on a hill. Here, the gradient of a road surface can be, for example, obtained from information on a detection result obtained by the gradient sensor Se5 or obtained based on map information. Then, when the magnitude of gradient of a road surface on which the vehicle is stopped is greater than or equal to a predetermined gradient determination threshold, the control device 30 determines that the vehicle is stopped on a hill. The gradient determination threshold can be, for example, set to a value included in a range of 5 [%] to 15 [%] when represented by a ratio of a distance from a horizontal plane to a change in a horizontal direction, or set to a value included in a range of 3 degrees to 10 degrees when converted to an angle.

It is also possible to further include other conditions in the conditions for performing lock release control. As described above, the vehicle includes the service brake operated by the brake pedal 93 and the parking brake 94. When the parking lock mechanism 10 is switched from the unlocked state to the locked state with the vehicle stopped by braking force by at least one of the service brake and the parking brake 94, and the braking force is still maintained thereafter, large road surface gradient torque T1 does not act on the parking gear 2. In view of this, the operating state of the service brake or the parking brake 94 can be included in the conditions for performing lock release control. For example, the conditions for performing lock release control can include at least any of the following conditions: the service brake is not operated at a point in time when a determination as to whether the conditions for performing lock release control are satisfied is made (hereinafter, referred to as "determination point in time"); the braking force by the service brake is less than or equal to a predetermined threshold at the determination point in time; the parking brake 94 is not operated at the determination point in time; the service brake is temporarily brought into a non-operating state during a period from a point in time when the parking lock mechanism 10 is switched to the locked state until the determination point in time; and the parking brake 94 is temporarily brought into a non-operating state during a period from a point in time when the parking lock mechanism 10 is switched to the locked state until the determination point in time.

If the conditions for performing lock release control have been satisfied (step #01: Yes), the control device 30 starts control of the transmission mechanism TM to transmit counter torque T2 to the parking gear 2 (step #02). Specifically, when the vehicle is stopped on an uphill slope, control of the transmission mechanism TM to form a forward gear starts, and when the vehicle is stopped on a downhill slope, control of the transmission mechanism TM to form a reverse gear starts. Note that when the internal combustion engine serving as the drive power source E has not started at this point in time, the control device 30 also performs control to start the internal combustion engine. Then, if the transmission of the counter torque T2 to the parking gear 2 has started (step #03: Yes), the control device 30 starts torque limiting control (step #04).

The determination in step #03 can be made, for example, based on the current value of an engagement pressure instruction (hydraulic pressure instruction) for a transmission engagement device that is engaged to form a gear, the current position in a change pattern of the engagement pressure instruction, the time elapsed from the start of control to allow the transmission engagement device that is engaged to form a gear to be engaged, a change in the speed ratio of the torque converter TC, a change in the rotational speed of the turbine runner TCb (input member I), etc. For example, the configuration can be such that when the change pattern of the engagement pressure instruction for the transmission engagement device is a pattern in which a pre-charge period during which the engagement pressure instruction is set to predetermined pre-charge pressure (pressure for first filling), a standby period during which the engagement pressure instruction is set to standby pressure lower than the pre-charge pressure, and a sweep period during which the engagement pressure instruction is set so as to gradually increase from the standby pressure are set in this order, it is determined that the transmission of the counter torque T2 to the parking gear 2 has started, on condition that the end time of the standby period (the start time of the sweep period) has reached. In addition, the configuration can also be such that it is determined that the transmission of the counter torque T2 to the parking gear 2 has started, on condition that the amount of change in the speed ratio of the torque converter TC after starting control of the transmission mechanism TM to transmit the counter torque T2 to the parking gear 2, or the amount of change in the rotational speed of the turbine runner TCb is greater than or equal to a predetermined threshold.

After starting the torque limiting control (step #04), the control device 30 determines whether conditions for starting engagement release control that releases the engagement of the parking pawl 11 with the parking gear 2 have been satisfied (step #05). The determination in step #05 can be made, for example, based on the time elapsed from the start of transmission of the counter torque T2 to the parking gear 2. Namely, the configuration can be such that it is determined that the conditions for starting engagement release control have been satisfied, on condition that the elapsed time is greater than or equal to a predetermined determination threshold. The determination threshold for this case is set to a value at which the load accumulated in the parking gear 2 is estimated to have decreased to a target load. The target load is set to a magnitude at which shock occurring upon releasing the engagement of the parking pawl 11 with the parking gear 2 when a load having the magnitude of the target load is accumulated in the parking gear 2 is in an allowable range. The value of the determination threshold is variably set, for example, according to the magnitude of the road surface gradient torque T1 (the magnitude of gradient of a road surface), the magnitude of output torque from the drive power source E, the value or change rate of the engagement pressure instruction for the transmission engagement device, etc.

If the conditions for starting engagement release control have been satisfied (step #05: Yes), the control device 30 starts engagement release control (step #06). Namely, the control device 30 starts control for switching the parking lock mechanism 10 from the locked state to the unlocked state. Then, if the engagement of the parking pawl 11 (engaging member) with the parking gear 2 (rotating member) has been released (step #07: Yes), i.e., if the parking lock mechanism 10 has been switched to the unlocked state, the control device 30 terminates the torque limiting control (step #08) and ends the process for lock release control. The determination in step #07 can be made, for example, based on information on a detection result obtained by the parking lock sensor Se8. In this case, depending on the configuration of the parking lock sensor Se8, the point in time when it is determined based on information on a detection result obtained by the parking lock sensor Se8 that the parking lock mechanism 10 has been switched to the unlocked state may be a point in time earlier than the point in time when the engagement of the parking pawl 11 with the parking gear 2 is completely released. In this case, the configuration may be such that the torque limiting control is terminated at a point in time later than the point in time when it is determined based on information on a detection result obtained by the parking lock sensor Se8 that the parking lock mechanism 10 has been switched to the unlocked state.

Figure 5:
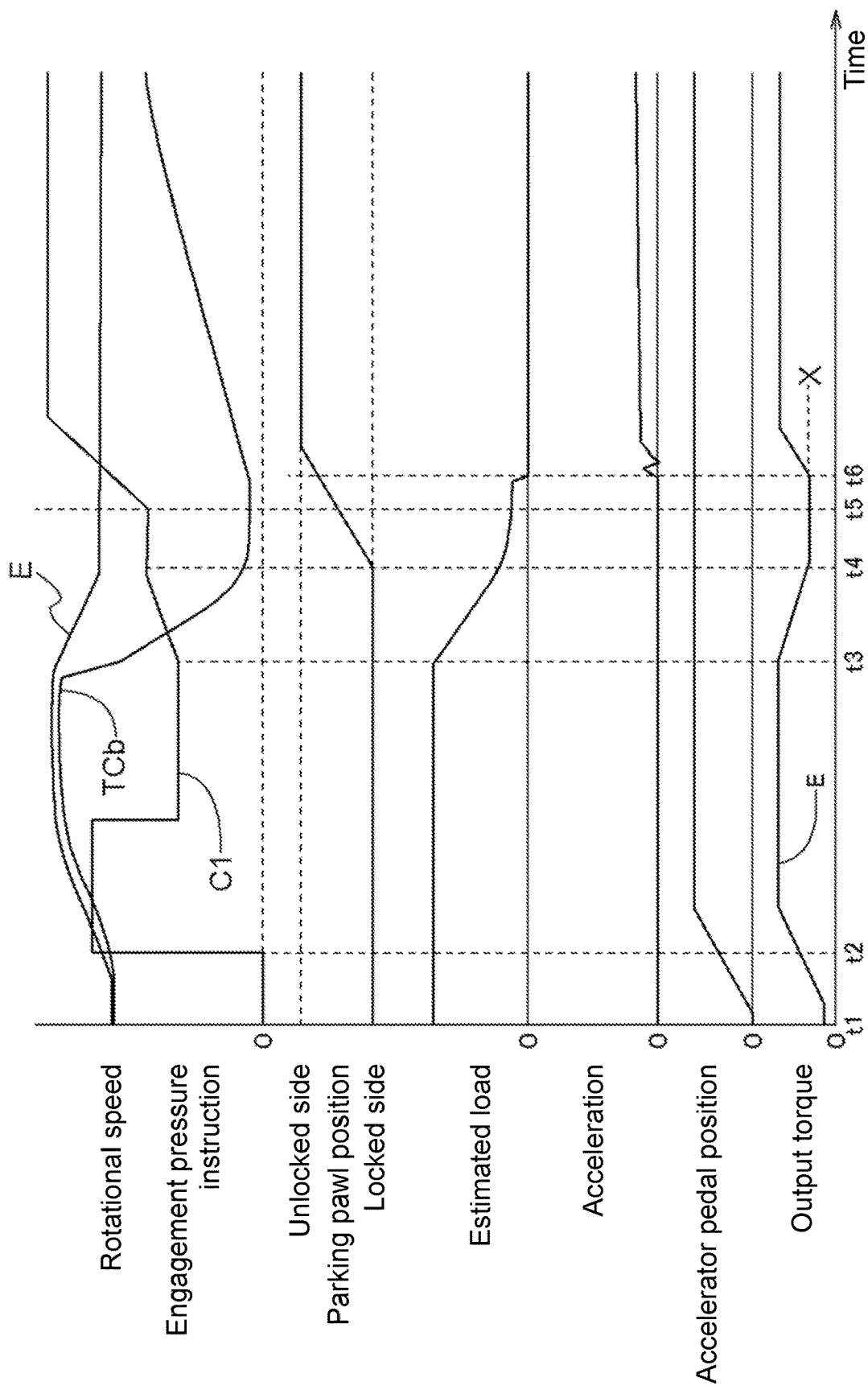
FIG. 5 is a time chart showing an example of control behavior of the lock release control according to the embodiment.

Specific operations of lock release control performed by the control device 30 according to the present embodiment will be described with reference to an example shown in FIG. 5. In this example, a situation is assumed in which the conditions for performing lock release control are satisfied by selecting the D-range by the range selection device 91 with the vehicle stopped on an uphill slope, and counter torque T2 is transmitted to the parking gear 2 by forming the first gear by the transmission mechanism TM. When the conditions for performing lock release control have been satisfied at time t1, at time t2 control for allowing the transmission mechanism TM to form the first gear starts. Specifically, at time t2, the engagement pressure instruction for the first clutch C1 increases to the pre-charge pressure in a stepwise manner and is thereafter maintained at the standby pressure. Note that in this example the vehicle driver steps on the accelerator pedal 92 during a period between time t1 and t2, and the output torque from the drive power source E and the rotational speed of the drive power source E increase according to the increase in accelerator pedal position.

At time t3, a gradual increase in the engagement pressure instruction for the first clutch C1 starts, by which transmission of counter torque T2 to the parking gear 2 starts. By this, at and after time t3, the estimated value of a load (estimated load) accumulated in the parking gear 2 starts to decrease. Note that with the transmission of the counter torque T2 to the parking gear 2 from the drive power source E, the rotational speed of the turbine runner TCb becomes lower than the rotational speed of the drive power source E. In addition, at time t3, torque limiting control starts and the torque of the drive power source E starts decreasing toward the threshold X. Accordingly, the rotational speed of the drive power source E also decreases. Note that, in this example, at time t3 torque transmission by the transmission mechanism TM in a transmission state corresponding to the drive range selected by the range selection device 91 (torque transmission by the transmission mechanism TM in a gear corresponding to the selected drive range) starts.

At time t4, when the conditions for starting engagement release control that releases the engagement of the parking pawl 11 with the parking gear 2 have been satisfied, control for switching the parking lock mechanism 10 from the locked state to the unlocked state starts. By this, the position of the parking pawl 11 starts to move (swing) toward a position on the unlocked side (a position in the unlocked state) from a position on the locked side (a position in the locked state). In this example, at and after time t4, the engagement pressure instruction for the first clutch C1 is maintained constant. In addition, in this example, at time t4 the output torque from the drive power source E decreases to the threshold X, and at and after time t4 the output torque from the drive power source E is maintained at the threshold X.

At time t5, it is determined that the parking lock mechanism 10 has been switched to the unlocked state. Note that, in this example, at time t6 the engagement of the parking pawl 11 with the parking gear 2 is completely released, but it is determined at time t5 earlier than time t6 that the parking lock mechanism 10 has been switched to the unlocked state. With the determination at time t5 that the parking lock mechanism 10 has been switched to the unlocked state, at and after time t5 the engagement pressure instruction for the first clutch C1 increases toward pressure (e.g., full-engagement pressure) that allows the first clutch C1 to be direct-coupling engaged. Thereafter, when the engagement of the parking pawl 11 with the parking gear 2 is completely released at time t6, shock according to the magnitude of a load accumulated in the parking gear 2 at that point in time occurs in the vehicle (see a line representing the acceleration of the vehicle in FIG. 5). Thereafter, the vehicle starts moving at acceleration according to the accelerator pedal position. Here, the magnitude of a load accumulated in the parking gear 2 at the point in time (time t6) when the engagement of the parking pawl 11 with the parking gear 2 is released is smaller compared to a magnitude obtained when the control according to the present embodiment is not performed (a load comparable to the estimated load at time t3). Thus, large shock does not occur in the vehicle. Note that, in the example shown in FIG. 5, the torque limiting control is terminated at time t6 at which the engagement of the parking pawl 11 with the parking gear 2 is completely released, instead of the point in time (time t5) when it is determined that the parking lock mechanism 10 has been switched to the unlocked state. Thereafter, the output torque from the drive power source E is increased to a magnitude according to the accelerator pedal position.

3. Other Embodiments

Other embodiments of the control device will be described. Note that configurations disclosed in the following respective embodiments can also be applied in combination with configurations disclosed in other embodiments as long as a contradiction does not arise.

(1) The above-described embodiment describes, as an example, a configuration in which torque limiting control starts at a point in time when transmission of counter torque T2 to the parking gear 2 has started (at a point in time when it is determined that the transmission has started). However, the configuration is not limited thereto, and the configuration can also be such that torque limiting control starts before the above-described point in time. For example, the configuration can be such that torque limiting control starts at a point in time when control of the transmission mechanism TM for transmitting counter torque T2 to the parking gear 2 has started (time t2 in the above-described example of FIG. 5).

(2) The above-described embodiment describes, as an example, a configuration in which torque limiting control is terminated at a point in time when the engagement of the parking pawl 11 with the parking gear 2 has been released (at a point in time when it is determined that the engagement has been released) or at a point in time thereafter. However, the configuration is not limited thereto and, for example, the configuration can also be such that the control device 30 terminates torque limiting control on condition that the engagement of the parking pawl 11 with the parking gear 2 has been released and torque transmission by the transmission mechanism TM in a transmission state corresponding to a drive range selected by the range selection device 91 (in the above-described embodiment, torque transmission by the transmission mechanism TM in a gear corresponding to the selected drive range) has started.

(3) The above-described embodiment describes, as an example, a configuration in which the state of the parking lock mechanism 10 is switched by the hydraulic actuator 14 between the locked state and the unlocked state. However, the configuration is not limited thereto and, for example, the configuration can also be such that the state of the parking lock mechanism 10 is switched by an electric actuator between the locked state and the unlocked state.

(4) The above-described embodiment describes, as an example, a configuration in which the transmission engagement devices (excluding the one-way clutch F) included in the transmission mechanism TM are hydraulically actuated engagement devices. However, the configuration is not limited thereto, and engagement devices that are controlled by drive power other than hydraulic pressure, such as drive power of an electromagnet or drive power of a servo motor, may be included as transmission engagement devices in the transmission mechanism TM.

(5) The above-described embodiment describes, as an example, a configuration in which the transmission mechanism TM is a stepped automatic transmission mechanism. However, the configuration is not limited thereto and, for example, the configuration can also be such that the transmission mechanism TM includes a forward/reverse switching mechanism and a continuously variable transmission mechanism (e.g., a belt-type continuously variable transmission mechanism) that changes the gear ratio steplessly (i.e., continuously). Though details are omitted, the forward/reverse switching mechanism includes a forward engagement device and a reverse engagement device. The forward/reverse switching mechanism is configured to transmit the rotation of the drive power source E to the wheels W in a rotation direction in which the vehicle travels forward, with the forward engagement device engaged and the reverse engagement device disengaged, and to transmit the rotation of the drive power source E to the wheels W in a rotation direction in which the vehicle travels backward, with the forward engagement device disengaged and the reverse engagement device engaged. In addition, the forward/reverse switching mechanism goes into a state of not transmitting torque in a state in which both of the forward engagement device and reverse engagement device are disengaged. Namely, in a state in which both of the forward engagement device and reverse engagement device are disengaged, the state of the transmission mechanism TM including the forward/reverse switching mechanism goes into the neutral state. As such, when the transmission mechanism TM is configured to include the forward/reverse switching mechanism and the continuously variable transmission mechanism, in a case in which the control device 30 performs lock release control when the vehicle is stopped on an uphill slope, of the forward engagement device and the reverse engagement device, only the forward engagement device is allowed to be engaged so that counter torque T2 in a direction in which the vehicle travels forward can be transmitted to the parking gear 2. In addition, in a case in which the control device 30 performs lock release control when the vehicle is stopped on a downhill slope, of the forward engagement device and the reverse engagement device, only the reverse engagement device is allowed to be engaged so that counter torque T2 in a direction in which the vehicle travels backward can be transmitted to the parking gear 2.

(6) Regarding other configurations, too, it is to be understood that the embodiments disclosed in this specification are in all respects merely illustrative. Therefore, a person skilled in the art can make various modifications as appropriate without departing from the spirit and scope of the present disclosure.

4. Summary of the Above-Described Embodiment

A summary of the control device described above will be described below.

The control device (30) whose control target is a vehicle drive device (1) provided with a transmission mechanism (TM) and a rotating member (2) in a power transmission path in this order from a drive power source (E) side, and provided with a parking lock mechanism (10) that restricts rotation of the rotating member (2) by allowing an engaging member (11) to engage with the rotating member (2), the power transmission path connecting the drive power source (E) to wheels (W), in which the control device (30) performs lock release control when a drive range is selected by a range selection device (91) with the transmission mechanism (TM) being in a neutral state in which torque transmission is not performed, the parking lock mechanism (10) being in a locked state in which the engaging member (11) engages with the rotating member (2), and a vehicle stopped on a hill, the range selection device (91) being provided in the vehicle, and the drive range allowing the vehicle to travel forward or backward, the lock release control controls the transmission mechanism (TM) such that counter torque (T2) is transmitted to the rotating member (2) from the drive power source (E) side, and releases the engagement of the engaging member (11) with the rotating member (2) with the counter torque (T2) transmitted to the rotating member (2), the counter torque (T2) being torque in an opposite direction to torque (T1) acting on the rotating member (2) from the wheels (W) side according to gradient of a road surface, and the control device (30) performs torque limiting control at least during a period while the lock release control is performed, the torque limiting control limiting a magnitude of output torque from the drive power source (E) to less than or equal to a predetermined threshold (X) regardless of an amount of operation on an accelerator pedal (92) provided in the vehicle, and the period being from when the transmission of the counter torque (T2) to the rotating member (2) starts until the engagement of the engaging member (11) with the rotating member (2) is released.

According to this configuration, by performing torque limiting control, the magnitude of output torque from the drive power source (E) can be limited to less than or equal to the predetermined threshold (X), regardless of the amount of operation on the accelerator pedal (92) provided in the vehicle. The torque limiting control is performed at least during a period from when transmission of counter torque (T2) to the rotating member (2) starts until engagement of the engaging member (11) with the rotating member (2) is released, while lock release control is performed. Namely, the torque limiting control is performed at least during a period during which the counter torque (T2) can act on the rotating member (2) engaging with the engaging member

(11) from the drive power source (E) side. Thus, even when a vehicle driver steps on the accelerator pedal (92) during a period from when lock release control starts until the parking lock mechanism (10) is switched to the unlocked state, the magnitude of the counter torque (T2) can be suppressed from becoming excessive over torque (T1) acting on the rotating member (2) from the wheels (W) side according to the gradient of a road surface. As a result, even when the vehicle driver steps on the accelerator pedal (92) during a period before the parking lock mechanism (10) is switched to the unlocked state, it becomes possible to reduce shock that can occur upon switching the parking lock mechanism (10) to the unlocked state.

Here, it is preferred that the torque limiting control be terminated on condition that the engagement of the engaging member (11) with the rotating member (2) has been released and torque transmission by the transmission mechanism (TM) in a transmission state corresponding to the drive range selected by the range selection device (91) has started.

A situation in which the vehicle driver having selected a drive range using the range selection device (91) steps on the accelerator pedal (92) is generally a situation in which the driver has an intention of accelerating in the selected drive range. Even if the output torque from the drive power source (E) is set to a magnitude according to the amount of operation on the accelerator pedal (92) at a point in time when torque transmission by the transmission mechanism (TM) in a transmission state corresponding to the selected drive range has not started, acceleration intended by the driver cannot be performed, which can cause a wasteful reduction of energy efficiency. According to the above-described configuration, torque limiting control is terminated on condition that torque transmission by the transmission mechanism (TM) in a transmission state corresponding to a selected drive range has started, in addition to that the engagement of the engaging member (11) with the rotating member (2) has been released. Thus, in addition to suppressing the magnitude of the counter torque (T2) from becoming excessive over the torque (T1) acting on the rotating member (2) from the wheels (W) side according to the gradient of a road surface, a wasteful reduction of energy efficiency can also be suppressed.

The invention claimed is:

1. A control device that controls a vehicle drive device provided with a transmission mechanism and a rotating member in a power transmission path in this order from a drive power source side, and provided with a parking lock mechanism that restricts rotation of the rotating member by allowing an engaging member to engage with the rotating member, the power transmission path connecting a drive power source to wheels, the control device comprising:

an electronic control unit that is configured to:
  perform lock release control when a drive range is selected by a range selection device with the transmission mechanism being in a neutral state in which torque transmission is not performed, the parking lock mechanism being in a locked state in which the engaging member engages with the rotating member, and a vehicle stopped on a hill, the range selection device being provided in the vehicle, and the drive range allowing the vehicle to travel forward or backward,
    wherein the electronic control unit performs the lock release control to control the transmission mechanism such that counter torque is transmitted to the rotating member from the drive power source side, and release the engagement of the engaging member with the rotating member with the counter torque transmitted to the rotating member, the counter torque being torque in an opposite direction to torque acting on the rotating member from the wheels side according to gradient of a road surface; and
  perform torque limiting control at least during a period while the lock release control is performed, the torque limiting control limiting a magnitude of output torque from the drive power source to less than or equal to a predetermined threshold regardless of an amount of operation on an accelerator pedal provided in the vehicle, and the period being from when the transmission of the counter torque to the rotating member starts until the engagement of the engaging member with the rotating member is released.

2. The control device according to claim 1, wherein the electronic control unit is configured to terminate the torque limiting control when the engagement of the engaging member with the rotating member has been released and torque transmission by the transmission mechanism in a transmission state corresponding to the drive range selected by the range selection device has started.

* * * * *